United States Patent
Weng

(10) Patent No.: US 7,095,213 B2
(45) Date of Patent: Aug. 22, 2006

(54) MULTIFUNCTIONAL COMPLEX POWER SUPPLY DEVICE

(76) Inventor: Yuan-Lin Weng, No. 19-2, Hsinsheng Street, Chungho, Taipei County (TW)

( * ) Notice: Subject to any disclaimer, the term of this patent is extended or adjusted under 35 U.S.C. 154(b) by 0 days.

(21) Appl. No.: 10/998,725

(22) Filed: Nov. 30, 2004

(65) Prior Publication Data

US 2006/0113961 A1    Jun. 1, 2006

(51) Int. Cl.
*H02J 7/00* (2006.01)
*H02J 3/32* (2006.01)
*H02J 7/34* (2006.01)
*H02J 1/10* (2006.01)

(52) U.S. Cl. .................... 320/138; 320/103; 320/110; 320/113; 320/101; 307/48; 307/57

(58) Field of Classification Search ............... 320/103, 320/138, 113, DIG. 19, 101, 110; 307/113, 307/43, 48, 57
See application file for complete search history.

(56) References Cited

U.S. PATENT DOCUMENTS

| | | | |
|---|---|---|---|
| 5,111,127 A * | 5/1992 | Johnson ...................... 320/101 |
| 5,985,480 A | 11/1999 | Sato et al. .................... 429/65 |
| 6,335,611 B1 | 1/2002 | Sasaki ......................... 320/134 |
| 6,339,413 B1 | 1/2002 | Drake et al. .................. 345/50 |
| 2004/0239287 A1 * | 12/2004 | Batts-Gowins .............. 320/103 |

* cited by examiner

*Primary Examiner*—Karl Easthom
*Assistant Examiner*—Alexis Boateng
(74) *Attorney, Agent, or Firm*—Birch, Stewart, Kolasch & Birch, LLP

(57) ABSTRACT

A multifunctional complex power supply device has an anti-countercurrent and voltage-regulation circuit with a rechargeable battery connected in conjunction with a solar battery, a generator and a microphone. A first switch is mounted between the solar battery and the anti-countercurrent and voltage-regulation circuit, a second switch is between the generator and the anti-countercurrent and voltage-regulation circuit, and a third switch is between the microphone and the anti-countercurrent and voltage-regulation circuit. When using the power supply device, one of the switches is selected and the solar battery, generator or sound sounds input into the microphone can charge the rechargeable battery.

11 Claims, 6 Drawing Sheets

MULTIFUNCTIONAL COMPLEX POWER SUPPLY DEVICE

BACKGROUND OF THE INVENTION

1. Field of the Invention

The present invention relates generally to a type of multifunctional complex power supply device, and more particularly to a power supply device equipped with variety of power sources that can generate electricity. Option is available to switch on one of the power source devices and undertake the power supply when linked to a power-consuming gadget.

2. Description of the Prior Art

In the wake of prevalence in recent year to carry and use a rechargeable electric gadget (for examples: Mobile phone, wireless communicating device, PDA , , , etc.) at any place, such as mountain-climbing, train or ship, etc., therefore, the convenience of using these electric gadgets conveniently would be enhanced provided that a electricity-charging device with power supply to the electric gadget available aside all the time instead of the power supplied from battery only. However, a conventional generator is cumbersome, even the smallest type generator is inconvenient to carry with. If the power supply from generator is the only source to the electric gadget carried aside at a place without any other power source available, then it is bound to have vexation in depleting the physical strength and increasing inconvenience. Furthermore, it is going to consume too many batteries and elevate the burden of earth and money.

BRIEF DESCRIPTION OF THE INVENTION

In light of the drawbacks described in the prior art, the inventor took the advantage of his richly accumulated experience and technology from undertaking the manufacture of electric appliances and power supply devices, went through incessantly researches, experiments and ameliorations mainly focusing on the aforementioned shortcomings, and then developed & designed the present invention in the long run to rid of all the defects derived in the prior art, that is, a multifunctional complex power supply device of brand new type.

The present invention refers to a multifunctional complex power supply device, whose purpose consists of providing an anti-countercurrent & voltage-regulation circuit with a rechargeable battery connected in conjunction with a solar battery, a generator and a microphone; wherein, there is a first switch mounted in between the solar battery and the anti-countercurrent & voltage-regulation circuit, a second switch erected in between the generator and the anti-countercurrent & voltage-regulation circuit plus a third switch installed in between the microphone and the anti-countercurrent & voltage-regulation circuit; also, the rechargeable battery is linked to a power-consuming gadgets (for example: cellular phone or wireless communicating device, personal digital assistant (PDA) , , , etc.).

When using the power supply device, selection is available to switchover the first switch to ON-state so that the solar battery is energized to charge electricity to the rechargeable battery firstly, and then the rechargeable battery supplies power to the power-consuming gadget; or select to switchover the second switch to ON-state and so that the generator is enabled to charge electricity to the rechargeable battery first, and afterward the rechargeable battery supplies power to the power-consuming gadget; or select to switchover the third switch to ON-state with sounds input into the microphone so that microphone can take the advantage of electric energy through the transformation of sound pressure of the input sounds to charge electricity to the rechargeable battery, and then the rechargeable battery supplies this correspondingly charged electricity to the gadget of power consumption.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
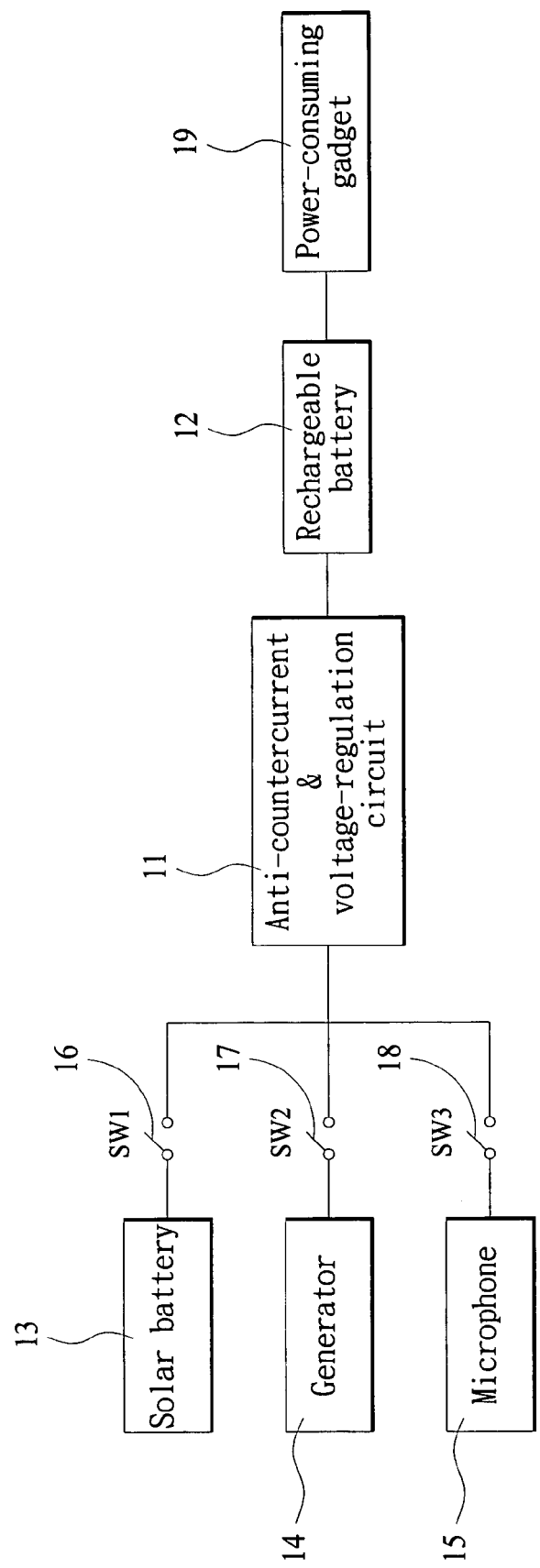
FIG. 1 is a block diagram of circuit for the complex power supply device in the present invention.
Figure 2:
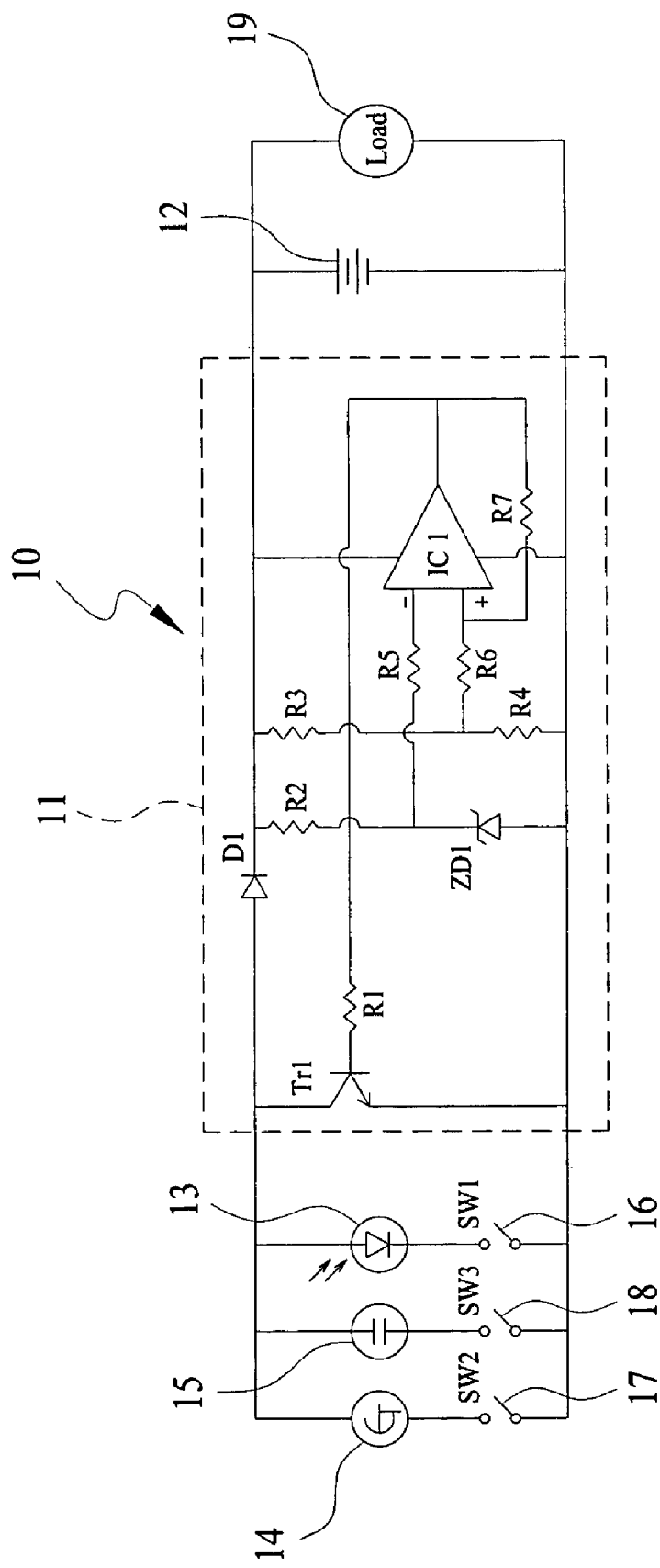
FIG. 2 is a circuit diagram of complex power supply device in the present invention.

The present invention relates generally to a multifunctional complex power supply device. Referring to FIG. 1 and FIG. 2, the power supply device 10 consists of an anti-countercurrent & voltage-regulation circuit 11 while this anti-countercurrent & voltage-regulation circuit 11 can block the reversal current of power supply and perform a voltage-regulation to the power supply; a rechargeable battery 12 (for instance: lithium battery) is connected to the anti-countercurrent & voltage-regulation circuit 11 in conjunction with a solar battery 13, a generator 14 (such as: manpower generator, wind-power generator , , , etc.) and a microphone 15; wherein, there is a first switch 16 mounted in between the solar battery 13 and the anti-countercurrent & voltage-regulation circuit 11, a second switch 17 erected in between the generator 14 and the anti-countercurrent & voltage-regulation circuit 11 plus a third switch 18 installed in between the microphone 15 and the anti-countercurrent & voltage-regulation circuit 11; also, the rechargeable battery 12 is linked to a power-consuming gadgets 19 (for example: cellular phone, wireless communicating device, radio, flashlight , , , etc.).

When using the power supply device 10 with the abovementioned components consisted, selection is available to switchover the first switch 16 to ON-state so that the solar battery 13 is energized to charge electricity to the rechargeable battery 12 firstly, and then the rechargeable battery 12 supplies power to the power-consuming gadget 19; or select to switchover the second switch 17 to ON-state so that the generator 14 is enabled to charge electricity to the rechargeable battery 12 first, and afterward the rechargeable battery 12 supplies power to the power-consuming gadget 19; or select to switchover the third switch 18 to ON-state with sounds input into the microphone 15 so that microphone 15 can take the advantage of electric energy through the transformation of sound pressure of the input sounds to charge electricity to the rechargeable battery 12, and then the rechargeable battery 12 supplies this correspondingly charged electricity as power to the gadget 19 for power consumption.

Please refer to FIG. 2 again, the solar battery 13 is connected to the first switch in series, the generator 14 and the second switch 17 are in series connection, and the microphone 15 and the third switch 18 are serially connected; meanwhile, the solar battery 13, the first switch 16 & the generator 14, the second switch 17 & the microphone 15, the third switch 18 are connected parallel. Thus, selection is available to switchover the first switch 16 to ON-state so that the solar battery 13 can charge electricity to rechargeable battery 12 firstly, and then the rechargeable battery 12 supplies power to the power-consuming gadget 19, or select to switchover the second switch 17 to ON-state so that generator 14 is energized to charge electricity to rechargeable battery 12 first, afterward the rechargeable battery 12 supplies power to the power-consuming gadget 19, or select to switch over the third switch 18 to ON-state with sound input into microphone 15 so that the microphone 15 can use the transformation of the sound pressure given from the sound into electric energy and charge electricity to rechargeable battery 12, and then the rechargeable battery 12 supplies this correspondingly charged electricity to the power-consuming gadget 19.

Figure 3:
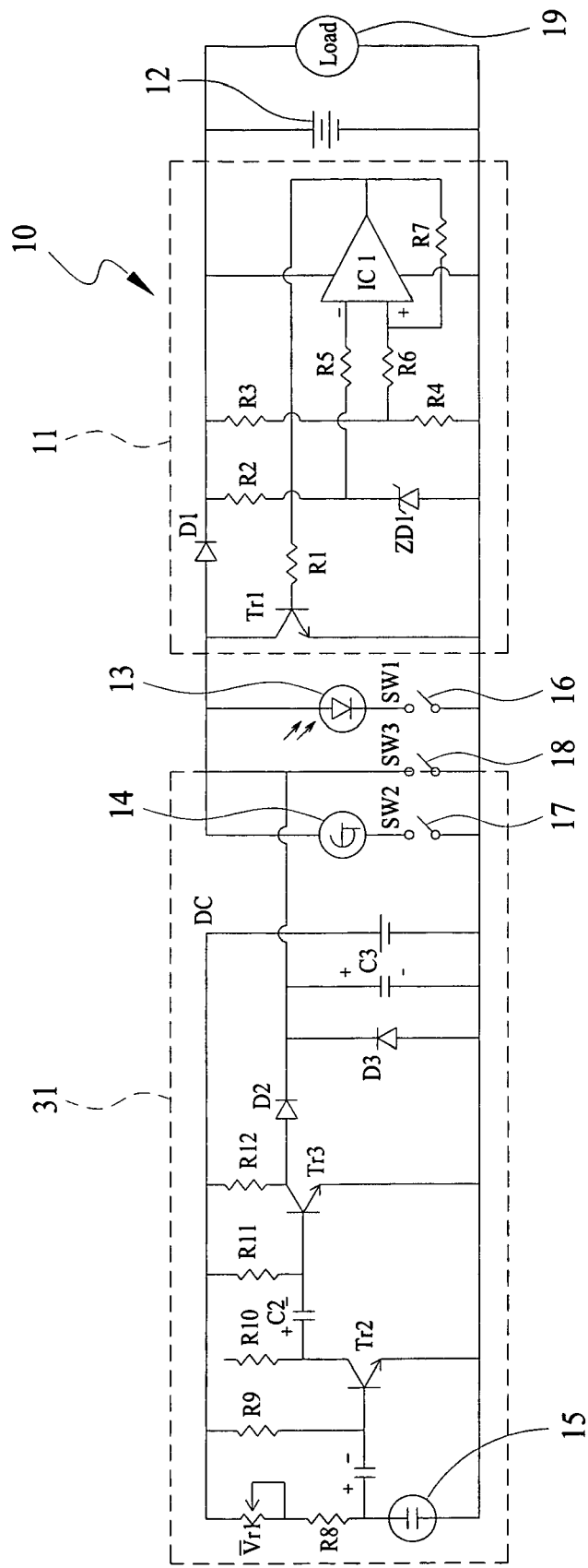
FIG. 3 is a circuit diagram for one of the embodiments of the complex power supply device in the present invention.

Please refer to FIG. 3 for another embodiment of the present invention. There is a two-level coupling amplification circuit 31 configured in between the microphone 15 and the third switch 18, and this amplification circuit 31 can amplify the sound pressure of the sound input into microphone 15 in order to elevate the energy of the sound pressure and let this amplified sound pressure be transformed into the electric energy for the rechargeable battery 12 as the corresponding electricity to be supplied to the power-consuming gadget 19.

Figure 4:
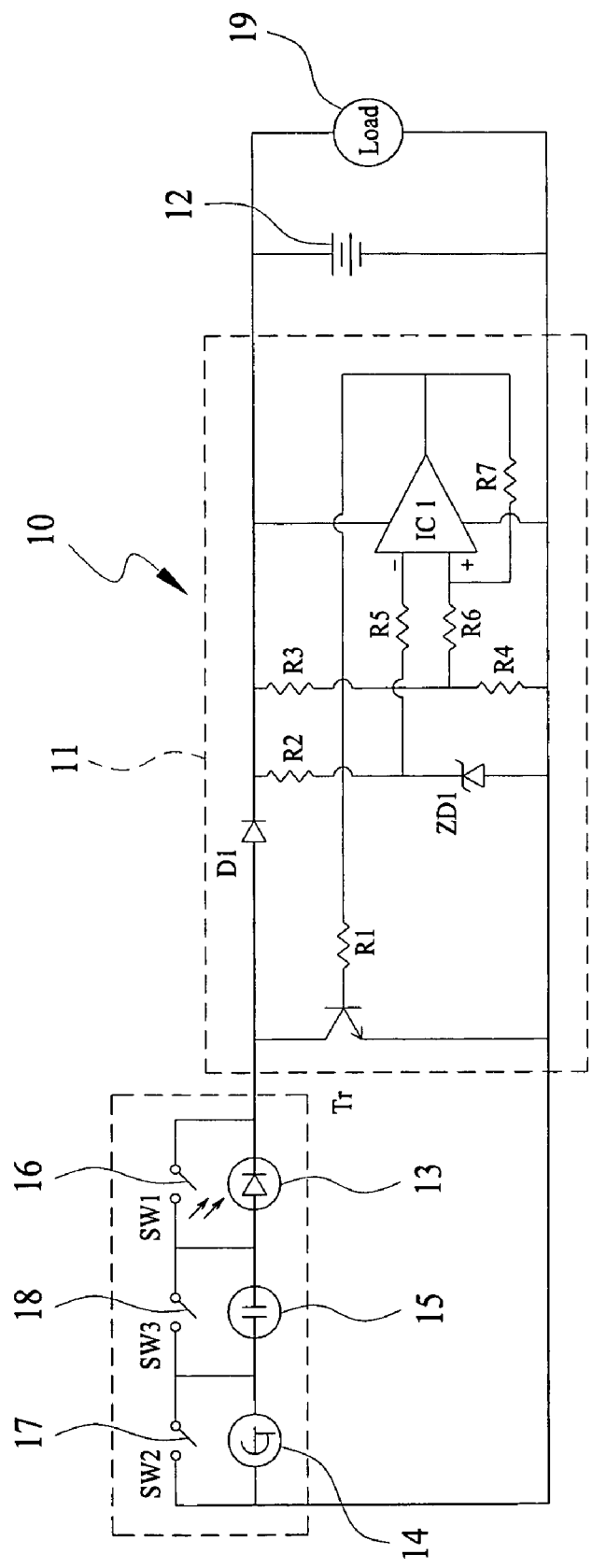
FIG. 4 is a circuit diagram for another embodiment of the complex power supply device in the present invention.

Please refer to FIG. 4 for another embodiment of the present invention again. The solar battery 13 and the first switch 16 are jointed together in parallel connection, the generator 14 and the second switch 17 are in parallel connection, the microphone 15 and the third switch 18 are connected parallel as well; meanwhile, the solar battery 13, the first switch 16 & the generator 14, the second switch 17 & the microphone 15, the third switch 18 are serially connected. Thus, selection is available to switchover the first switch 16 to OFF-state so that the solar battery 13 can charge electricity to the rechargeable battery 12 firstly, and then the rechargeable battery 12 supplies power to the power-consuming gadget 19, or select to switchover the second switch 17 to OFF-state so that the generator 14 can charge electricity to the rechargeable battery 12 first, afterward the rechargeable battery 12 supplies power to the power-consuming gadget 19, or select to switchover the third switch 18 to OFF-state with sound input into microphone 15 so that the microphone 15 can use the electrical energy transformed from the sound pressure of sound to supply the corresponding power to the power-consuming gadget 19.

Figure 5:
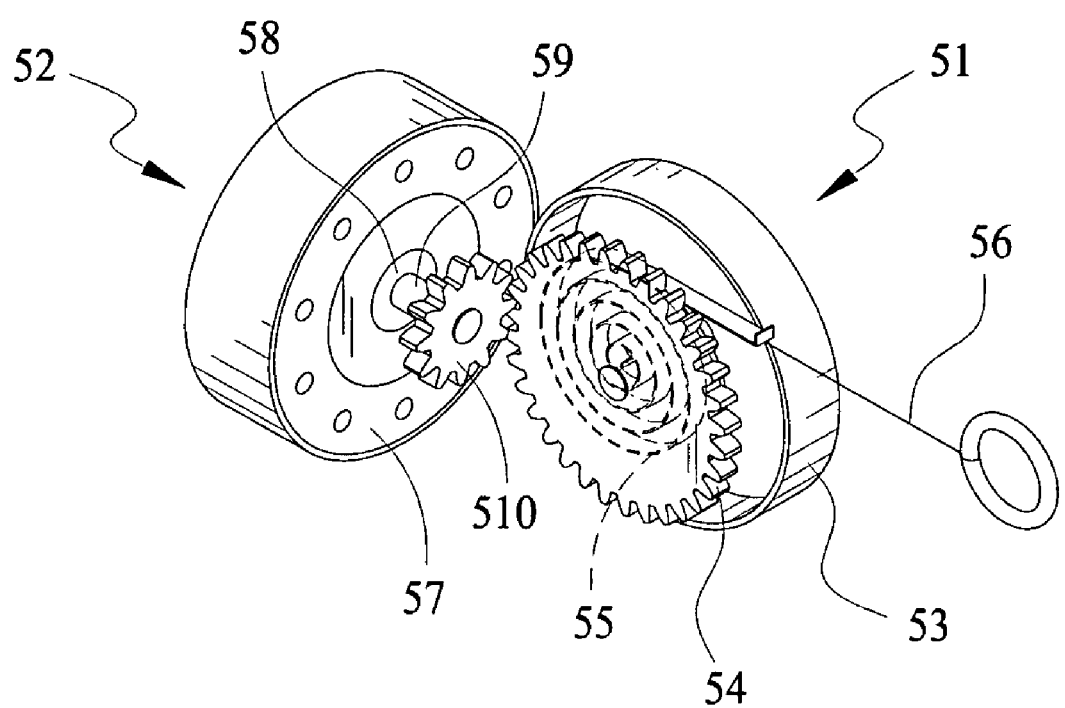
FIG. 5 is a stereo exploded diagram of manpower generator of the present invention.

Please refer to FIG. 5, the generator 14 can be a man-power generator (for instances: Hand-pulling generator or hand-rocking generator). Hand-pulling generator is used as the generator 14 in the present invention. The generator 14 has been assembled a driving part 51 and a power-generation part 52, wherein, an outer casing 53 is topped over the driving part 51 while there is a gear 54 pivoted to the outer casing 53 and a return spring 55 fitted in between the gear 54 and the outer casing 53, also the gear 54 has a pull wire 56 wound around its rotating shaft. Meanwhile, the power-generation part 52 has been mounted a stator 57 and a rotator 58 while the rotator 58 has another gear 510 coupled to its rotating shaft 59. The gear 510 is mated to clench the gear 54 so that gear 54 can react to produce a corresponding rotation when the pull wire 56 is being pulled outward and drive the rotator 58 to make rotation so that the generator 14 can generate the output electricity.

Figure 6:
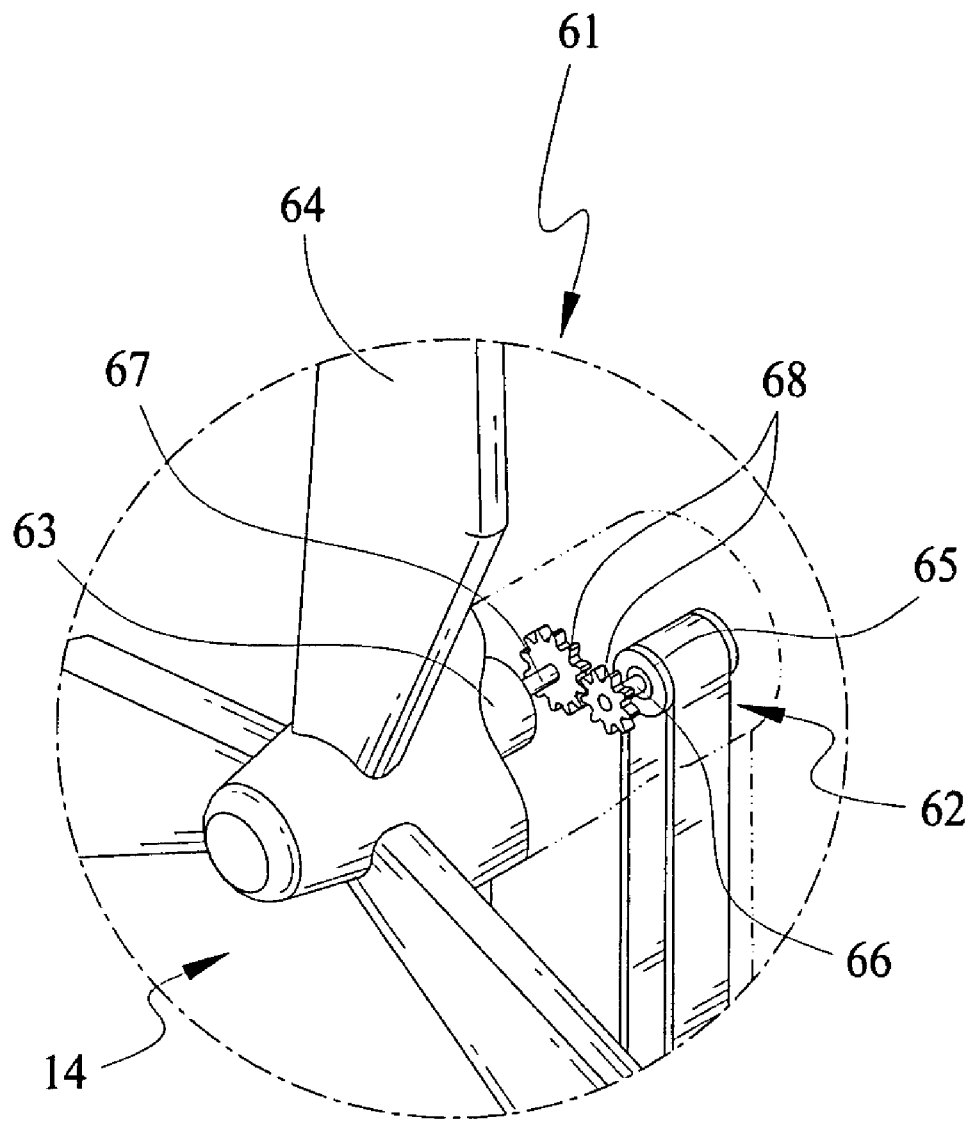
FIG. 6 is a stereo appearance diagram of wind-power generator of the present invention.

Please refer to FIG. 6, the generator 14 can be a wind-power generator. The wind-power generator 14 has been assembled a driving part 61 and a power-generation part 62, wherein, there is a rod frame 63 mounted in the driving part 61 while there is a fan blade 64 pivoted to the rod frame 63. Meanwhile, the power-generation part 62 has been mounted a stator 65 and a rotator 66; and the fan blade 64 has a pivot shaft 67 fitted inside the rod frame 63 and coupled to the rotator 66 through the transmission element 68 (for example: gear); thus, the transmission element 68 can drive rotator 66 to produce a synchronous rotation and enable the generator 14 to generate output electricity when fan blade 64 is driven to rotate by the flowing airstreams.

The power-consuming gadget 19 can be a flashlight in the present invention, the flashlight can be reacted to emit light and irradiate over the solar battery 13 so that the solar battery 13 can generate and output electricity to charge the rechargeable battery 12, and then the rechargeable battery 12 supplies power to the power-consuming gadget 19 (flashlight). In such a manner, energy can be repeatedly consumed until it runs out.

The power-consuming gadget 19 can be an electric fan in the present invention, the electric fan can be actuated to stir airstreams (wind power) to blow the fan blade 64 to revolve so that the generator 14 can generate and output electricity to charge the rechargeable battery 12, and then the rechargeable battery 12 supplies power to the power-consuming gadget 19 (electric fan). In such a manner, energy can be repeatedly consumed until it runs out.

The power-consuming gadget 19 can be a mobile phone in the present invention, the sound (such as: Sound of incoming call, talking voice, etc.) coming out from the mobile phone can be input into the microphone 15 so that the microphone 15 can use and transform the sound pressure of the sound into electric energy and charge the rechargeable battery 12 with this electric energy, and then the rechargeable battery 12 supplies this corresponding electricity to the power-consuming gadget 19 (mobile phone). In such a manner, energy can be repeatedly consumed until it runs out.

According to the aforementioned descriptions of the present invention, the multifunctional complex power supply device has been equipped with diverse type of power sources (generator 14, solar battery 13, and microphone 15) for electricity generation. Therefore, user may vary the present invention with the practical need of usage and choose a suitable method of power supply so that the performance and objectives of power supply are achievable.

As synthetically concluded from the foregoing descriptions, the multifunctional complex power supply device in the present invention truly has an unprecedented innovation in structure. There is neither a report relating to the present invention published in any publication nor the like product of the present invention seen in the market, hence, it is certain that the present invention has its novelty. In addition, the unique characteristics and functions of the present invention are far beyond the reach of conventional devices; thus, it is undeniable that it is more progressive than conventional devices and qualified to the prerequisite of new patent application stipulated in the Patent Law of R.O.C., and application of patent is filed in accordance with Law accordingly.

The present invention will become more fully understood from the detailed description given hereinbelow and the accompanying drawings which are given by way of illustration only, and thus are not limitative of the present invention, and wherein:

DESCRIPTION OF REPRESENTATIVE NUMBERINGS USED FOR THE MAJOR COMPONENTS IN THE FIGURES

Power supply device 10
Anti-countercurrent & voltage-regulation circuit 11
Rechargeable battery 12
Solar battery 13
Generator 14
Microphone 15
The first switch 16
The second switch 17
The third switch 18
Power-consuming gadget 19
Two-level coupling amplification circuit 31
Driving part 51
Power generation part 52
Outer casing 53
Gear 54
Return spring 55
Pull wire 56
Stator 57
Rotator 58
Rotating shaft 59
Anther gear 510
Driving part 61
Power generation part 62
Rod frame 63
Fan blade 64
Stator 65
Rotator 66
Pivot shaft 67
Transmission element 68

What is claimed is:

1. A multifunctional complex power supply device comprises:

an anti-countercurrent & voltage-regulation circuit with a rechargeable battery connected in conjunction with a solar battery, a generator and a microphone; wherein there is a first switch mounted in between the solar battery and the anti-countercurrent & voltage-regulation circuit, a second switch erected in between the generator and the anti-countercurrent & voltage-regulation circuit plus a third switch installed in between the microphone and the anti-countercurrent & voltage-regulation circuit; also, the rechargeable battery is linked to a power-consuming gadget;

when using the power supply device, selection is available to switchover the first switch to ON-state so that the solar battery is energized to charge electricity to rechargeable battery firstly, and then the rechargeable battery supplies power to the power-consuming gadget; or select to switchover the second switch to ON-state so that the generator is enabled to charge electricity to the rechargeable battery first, and afterward the rechargeable battery supplies power to the power-consuming gadget; or select to switchover the third switch to ON-state with sounds input into the microphone so that microphone can take the advantage of electric energy through the transformation of sound pressure of the input sounds to charge electricity to the rechargeable battery, and then the rechargeable battery supplies this correspondingly charged electricity to the gadget for power consumption.

2. The multifunctional complex power supply device, according to claim 1, wherein, the solar battery is connected to the first switch in series, the generator and the second switch are in series connection, and the microphone and the third switch are serially connected; meanwhile, the solar battery, the first switch & the generator, the second switch & the microphone, the third switch are connected parallel.

3. The multifunctional complex power supply device, according to claim 2, wherein, there is a two-level coupling & amplification circuit configured in between the microphone and the third switch, and this amplification circuit can amplify the sound pressure of the sound input into microphone in order to elevate the energy of the sound pressure so that this amplified sound pressure can be transformed into the electric energy for rechargeable battery as the corresponding electricity to be supplied to the power-consuming gadget.

4. The multifunctional complex power supply device, according to claim 1, wherein, the solar battery and the first switch are joined in parallel connection, the generator and the second switch are connected parallel the microphone and the third switch are in parallel connection as well; meanwhile, the solar battery, the first switch & the generator, the second switch & the microphone, the third switch are serially connected.

5. The multifunctional complex power supply device, according to claim 1, wherein, the generator is a manpower hand-pulling generator.

6. The multifunctional complex power supply device, according to claim 1, wherein, the rechargeable battery is a lithium battery.

7. The multifunctional complex power supply device, according to claim 1, wherein, the generator is a wind-power generator.

8. The multifunctional complex power supply device, according to claim 1, wherein, the generator is a manpowered hand-rocking generator.

9. The multifunctional complex power supply device, according to claim 1, wherein, the power-consuming gadget is a flashlight and the flashlight can be reacted to emit light and irradiate over the solar battery so that the solar battery can generate and output electricity to charge the rechargeable battery, and then the rechargeable battery supplies power to the power-consuming gadget.

10. The multifunctional complex power supply device, according to claim 7, wherein, the power-consuming gadget is an electric fan and the electric fan can be actuated to stir airstreams to blow a fan blade to revolve so that the generator, connected, to said blade can generate and output electricity to charge the rechargeable battery, and then the rechargeable battery supplies power to the power-consuming gadget.

11. The multifunctional complex power supply device, according to claim 1, wherein, the power-consuming gadget is a mobile phone and the sounds coming out from the mobile phone can be input into the microphone so that the microphone can use and transform the sound pressure of the sound into electric energy and charge the rechargeable battery with this electric energy, and later the rechargeable battery supplies this corresponding electricity to the power-consuming gadget.

* * * * *